(12) United States Patent
Bayliss

(10) Patent No.: US 7,783,658 B1
(45) Date of Patent: Aug. 24, 2010

(54) MULTI-ENTITY ONTOLOGY WEIGHTING SYSTEMS AND METHODS

(75) Inventor: David A. Bayliss, Delray Beach, FL (US)

(73) Assignee: Seisint, Inc., Boca Raton, FL (US)

( * ) Notice: Subject to any disclaimer, the term of this patent is extended or adjusted under 35 U.S.C. 154(b) by 367 days.

(21) Appl. No.: 11/812,323

(22) Filed: Jun. 18, 2007

(51) Int. Cl.
G06F 7/00 (2006.01)
G06F 17/30 (2006.01)
(52) U.S. Cl. .................................. 707/765; 707/776
(58) Field of Classification Search ............. 707/1–10, 707/100–104.1, 200–206
See application file for complete search history.

(56) References Cited

U.S. PATENT DOCUMENTS

2003/0069877 A1 * 4/2003 Grefenstette et al. ........... 707/2

OTHER PUBLICATIONS

Rahman et al., Feature weighting methods for abstract features applicable to motion based video indexing, 2004, IEEE, vol. 1, 676-680.*
Lun Xin et al., Ontology-based hierarchical conceptual model for semantic representation of events in dynamic scenes, 2005, IEEE, 57-64.*
William E. Winkler, "Improved Decision Rules in the Fellegi-Sunter Model Of Record Linkage," Bureau of Census, Washington, D.C., (15 pages), Jun. 18, 2007.
Federal Committee on Statistical Methodology, Office of Management and Budget, "Record Linkage Techniques—1997," Proceedings of an International Workshop and Exposition, Mar. 20-21, 1997, Arlington, VA (501 pages).

* cited by examiner

Primary Examiner—Jean B Fleurantin
(74) Attorney, Agent, or Firm—Finnegan, Henderson, Farabow, Garrett & Dunner, LLP

(57) ABSTRACT

Systems and methods are provided for multi-entity ontology weighting. In one implementation, a computer-implemented method is provided for identifying one or more target entities. The method receives an input data set. The input data set includes a plurality of tokens that reflect the one or more target entities. The method determines which of the plurality of tokens are labels, identifies a plurality of candidate entities that are related to each of the labels, assigns a weight to each of the plurality of candidate entities based on a frequency of each of the plurality of candidate entities, and ranks, for each of the labels, the plurality of candidate entities according to the assigned weights. The method then outputs, for each of the labels, the one of the plurality of candidate entities for that label that has been assigned a highest weight value.

36 Claims, 2 Drawing Sheets

US 7,783,658 B1

MULTI-ENTITY ONTOLOGY WEIGHTING SYSTEMS AND METHODS

BACKGROUND

I. Technical Field

The present invention generally relates to the field of data linking using multi-entity ontology weighting. More particularly, the invention relates to computerized systems and methods for matching a prospective set of related entities in view of other entities that are known to be related.

II. Background Information

In recent years, more and more information has been stored in electronic form. With the increase in the sheer volume of data, searching for desired information has become increasingly more difficult. For example, when searching for desired information, some traditional techniques examine data for specific alphanumeric characters. In particular, "record linkage" is a traditional searching technique that determines whether two or more data records include the same sequence of alphanumeric characters. When data records include the same entry of alphanumeric characters, the data records are considered related and are matched or "linked" together. By linked, it is meant that the data records are treated as a single record concerning the subject of the search.

Such a technique searches for a specific sequence of alphanumeric characters (e.g., a person's name) in data records. However, a name is often insufficient to uniquely identify a person because many people may share the same first and/or last names. Locating the desired name in one or more data records does not guarantee that the search has identified data records that pertain to the actual subject of the search. Consequently, such a technique often links together a large number of data records that actually do not refer to the intended subject.

Other traditional record linkage techniques evaluate data records in order to decide whether or not to link together two data records. One traditional technique considers the context of data in the data records. For example, more significance may attach to a match between two data records that include the name "Augustus" than to a match between two data records that include the name "John." Such technique is referred to as frequency-based matching. However, the use of frequency-based matching, while generally increasing accuracy, often does not adequately match data records, particularly when searching a large volume of data. For example, frequency-based matching does not adequately resolve searches that involve more common names or terms.

Accordingly, traditional searching techniques suffer from drawbacks that limit their accuracy. In large-scale searching endeavors in which millions of data records are searched, simple record linkage and frequency-based matching are insufficient to accurately identify specific entities, such as individuals. Accordingly, there is a need for improved systems and methods for data matching that are more accurate and efficient.

SUMMARY

Consistent with an embodiment of the present invention, a computer-implemented method is provided for uniquely identifying one or more target entities. The method may receive an input data set. The input data set may include a plurality of tokens that reflect the one or more target entities. The method may determine which of the plurality of tokens are labels, identify a plurality of candidate entities that are related to each of the labels, assign a weight to each of the plurality of candidate entities based on a frequency of each of the plurality of candidate entities, and rank, for each of the labels, the plurality of candidate entities according to the assigned weights. The method may then output, for each of the labels, the one of the plurality of candidate entities for that label that has been assigned a highest weight value.

Consistent with another embodiment of the present invention, a computerized system is provided for uniquely identifying one or more target entities. The system may comprise a data repository and a server that is in communication with the data repository. The server may receive an input data set. The input data set may include a plurality of tokens that reflect the one or more target entities. The server may determine which of the plurality of tokens are labels, identify a plurality of candidate entities that are related to each of the labels, assign a weight to each of the plurality of candidate entities based on a frequency of each of the plurality of candidate entities, and rank, for each of the labels, the plurality of candidate entities according to the assigned weights. The server may then output, for each of the labels, the one of the plurality of candidate entities for that label that has been assigned a highest weight value.

Consistent with yet another embodiment of the present invention, a computer-readable medium is provided that stores program instructions for implementing the above-described method.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
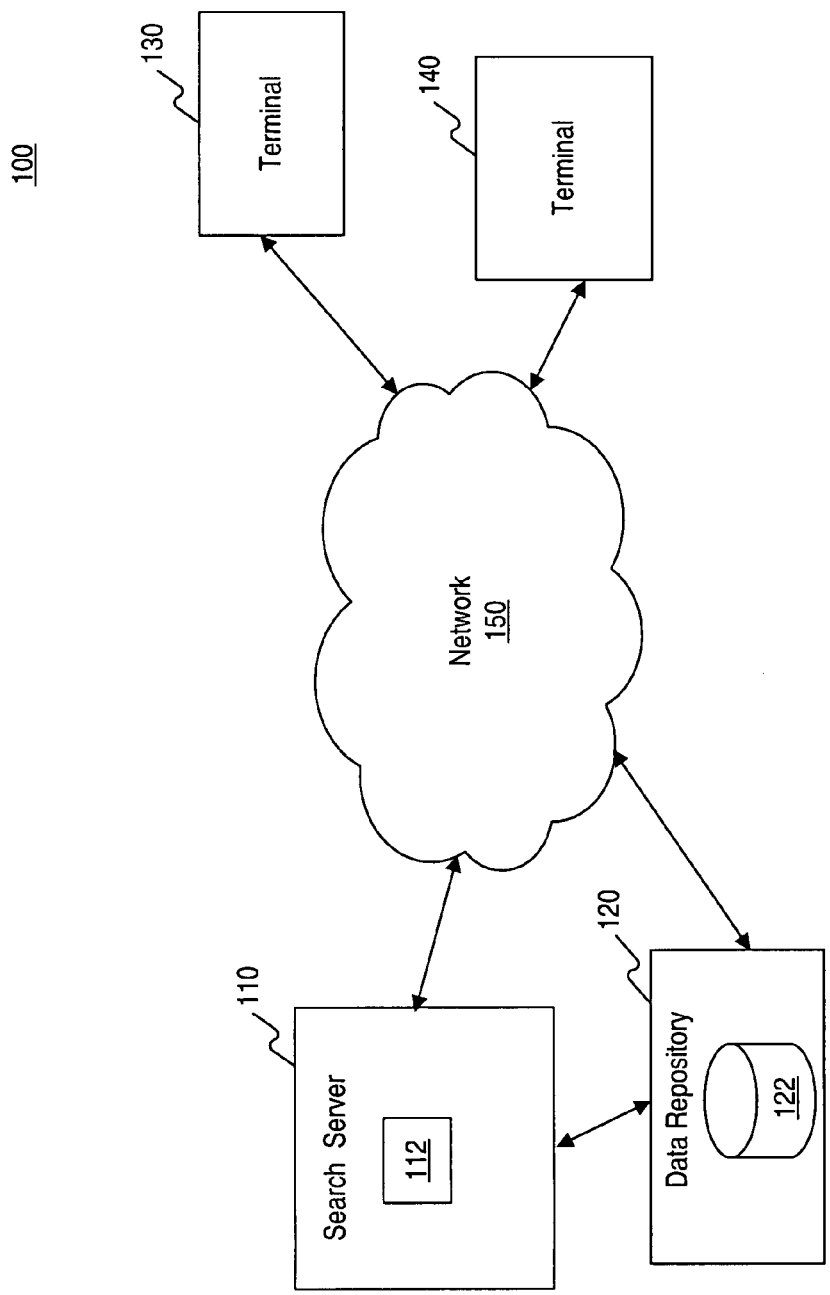
FIG. 1 is an exemplary system for linking data records in view of other data records that are known to be related.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

In the following description, the terms used in connection with disclosed embodiments shall have the following meanings. As used herein, the term "ontology" shall refer to a data model that represents a set of information within a domain and relationships between the information. A "data set" shall refer to any input data that is in electronic form. For example, a data set may be any kind of document, such as a webpage, a newspaper article, a book, etc., that is stored in electronic form or that is converted to and stored in electronic form. As the term is used herein, a "token" shall refer to a sequence of alphanumeric characters.

The term "entity" shall refer to a self-contained piece of data that has a distinct and separate existence. The data of an entity may comprise one or more tokens that describe or identify, for example, people, businesses, buildings, websites, vehicles, etc. A "knowledge base" shall refer to one or more databases storing data records for entities.

A "label" shall refer to any token that describes or partially describes an entity. A "partial entity reference" shall refer to a collection of labels that relate to the same entity. A "full entity reference" shall refer to a collection of tokens that relate to the same entity and are sufficient to uniquely identify the entity. A "target entity" shall refer to any entity that is being resolved from a data set. A "candidate entity" shall refer to any entity that could potentially be a target entity.

Systems and methods for multi-entity ontology weighting provide high quality matching between data sources. In particular, disclosed embodiments may extract multiple entities from a data set (e.g., a document). The extracted entities may then be linked together in a knowledge base in the context of data records that are already known to be related. This use of entity context information provides a higher degree of precision and recall. To use entity context information to a high degree of accuracy, disclosed embodiments may use a knowledge base that contains a large amount of data including names of people, cities, states, companies, occupations, and relative names. According to disclosed embodiments, this information, combined with data records for relatives of persons in the knowledge base and records for individuals that identify each person's work information (e.g., business name and/or address), may increase matching rates. Furthermore, entities may be found on the basis of information that does not exist in a single record or on the basis of attributes of related entities.

FIG. 1 is an example of a system 100 that may link together two data records in the context of the other data records that are already known to be related. As shown in system 100, search server 110, data repository 120, and terminals 130 and 140 are connected to a network 150. Although a specific numbers of servers and two terminals are depicted in FIG. 1, any number of these devices may be provided. Furthermore, the functions provided by one or more devices of system 100 may be combined. In particular, the functionality of any one or more devices of system 100 may be implemented by any appropriate computing environment.

Network 150 provides communications between the various devices in system 100, such as search server 110, data repository server 120, and terminals 130 and 140. In addition, search server 110 may access legacy systems (not shown) via network 150, or may directly access legacy systems, databases, or other network applications. Network 150 may be a shared, public, or private network, may encompass a wide area or local area, and may be implemented through any suitable combination of wired and/or wireless communication networks. Furthermore, network 150 may comprise a local area network (LAN), a wide area network (WAN), an intranet, or the Internet.

Search server 110 may comprise a computer (e.g., a personal computer, network computer, server, or mainframe computer) having one or more processors (not shown) that may be selectively activated or reconfigured by a computer program. Furthermore, search server 110 may distribute data for parallel processing by one or more additional servers (not shown). Search server 110 may also be implemented in a distributed network. Alternatively, search server 110 may be specially constructed for carrying-out methods consistent with disclosed embodiments.

Search server 110 may include a memory 112 for storing program modules that, when executed by a processor, perform one or more processes that link together two data records in the context of the other data records that are already known to be related. Memory 112 may be one or more memory devices that store data as well as software and may also comprise, for example, one or more of RAM, ROM, magnetic storage, or optical storage. Since disclosed embodiments may be implemented using an HTTPS (hypertext transfer protocol secure) environment, data transfer over a network, such as the Internet, may be done in a secure fashion.

Data repository 120 may include a database 122 that stores data records for entities such as a people, businesses, buildings, websites, vehicles, etc. Although certain entities are specified herein, one of ordinary skill in the art will appreciate that embodiments may apply to any kind of entity. Furthermore, although one database is shown in FIG. 1, data repository may include more than one database. The databases included in data repository 120 may constitute a knowledge base. Furthermore, data repository 120 may receive data from search server 110, terminals 130-140, and/or other servers (not shown) available via network 150. Although shown as separate entities in FIG. 1, search server 110 and data repository server 120 may be combined. For example, search server 110 may include one or more databases in addition to or instead of data repository 120. Furthermore, search server 110 and data repository 120 may exchange data directly or via network 150.

Terminals 130-140 may be any type of device for communicating with search server 110 and/or data repository 120 over network 150. For example, terminals 130-140 may be personal computers, handheld devices, or any other appropriate computing platform or device capable of exchanging data with network 150. Terminals 130-140 may each include a processor (not shown) and a memory (not shown). Furthermore, terminals 130-140 may execute program modules that provide one or more graphical user interfaces (GUIs) for interacting with network resources and/or accessing search server 110. For example, one of terminals 130-140 may transmit a data set (e.g., a webpage, a newspaper article, a book, etc.) to search server 110.

Figure 2:
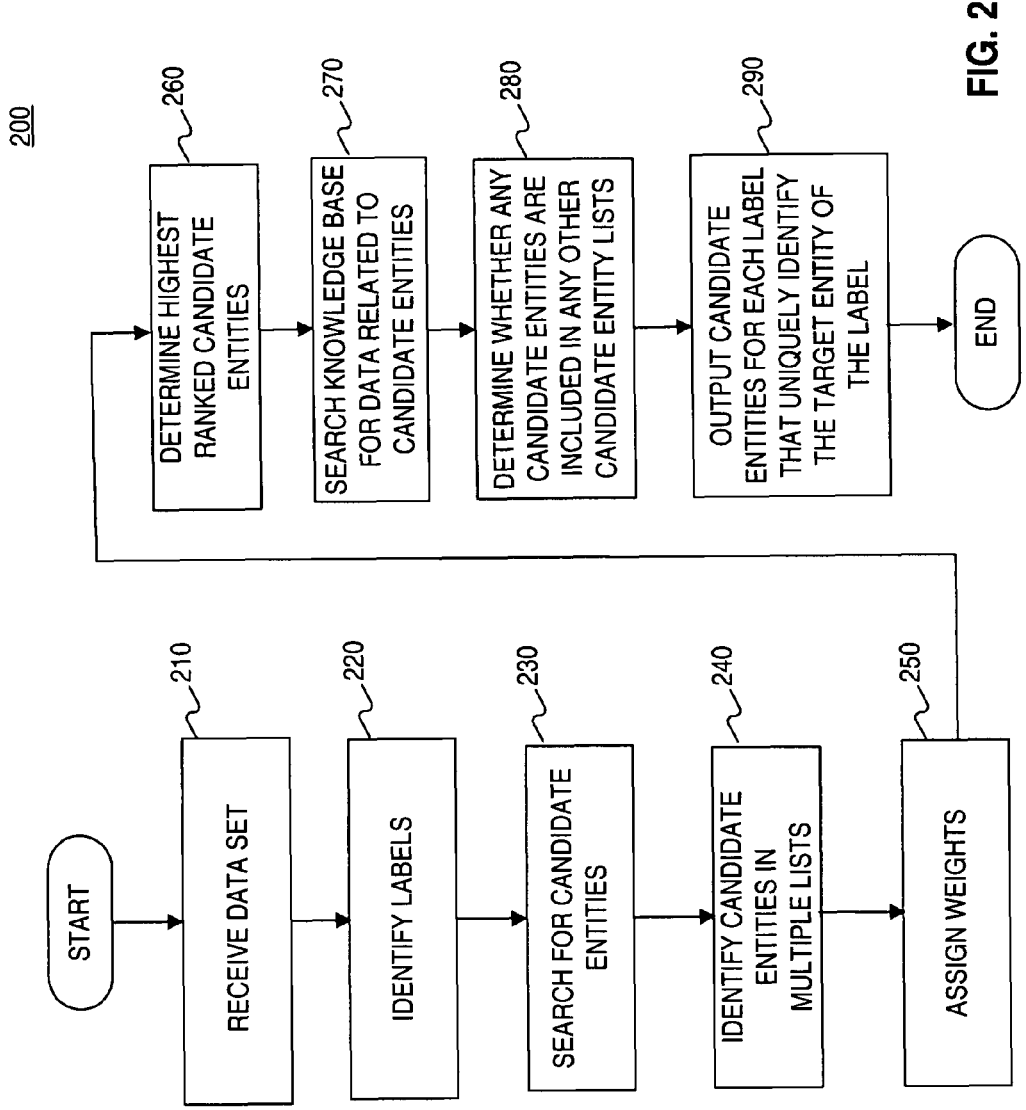
FIG. 2 is a flow diagram of an exemplary method for linking data records in view of other data records that are known to be related.

FIG. 2 is a flow diagram 200 of an exemplary method for linking data records in view of other data records that are known to be related. For example, the method may match a prospective collection of related entities to a knowledge base in which the entities are related. According to a disclosed embodiment, the following method may be implemented by search server 110.

At the start of the process, in step 210, search server 110 may receive an input data set. The input data set may include a collection of tokens that may form partial entity references to a set of unknown entities. Search server 110 may receive the input data set over a network or from a local storage. For example, the input data set may have been read from a document (e.g., a webpage), for example, at one of terminals 130-140.

Next, in step 220, search server 110 may identify labels that are included in the input data set. To determine whether a token included in the input data set is or is not a label, search server 110 may search a database of data repository 120, which, as discussed above, may constitute a knowledge base. Furthermore, the database may store data (e.g., the labels) as one or more files, tables, etc. In this step, search server 110 may compare each token in the input data set to the labels that are stored in the database. The labels may be stored in a file or a separate database included in data repository 120. Accordingly, for each token, the system or method may compare the token with the labels in the database.

Categories of labels include names, telephone numbers, states, country, city, address, name, first name, last name, business name, FEINs (Federal Employer Identification Numbers), vehicle identification numbers (VINs), license plate, email address, URLs, social security numbers (SSNs), addresses, patent numbers, federal court docket numbers. The foregoing label categories are merely exemplary and other label categories are consistent with the principles of the present invention.

In order to provide a sufficient knowledge base, the labels that are stored in the database may have been collected previously and the database may include a large amount of labels. For example, the database may include a compilation of data for most persons in a geographical area, such as a country or even the world. If a token matches a label in the database, then search server 110 may classify the token as a label. If a token is not classified as a label, it is no longer used in this process.

In step 230, search server 110 may search data repository 120 for entities that include the labels that were identified in the previous step. Accordingly, for each label, search server 110 may return a list of candidate entities. The candidate entities may relate to a label that was identified in the initial input. Accordingly, search server 110 may produce a plurality of lists of candidate entities wherein each list may specify candidate entities for each of the labels. The lists may be stored in, for example, a database of data repository 120.

Producing such a large volume of data may be impractical from an engineering standpoint without massive storage devices and a complex of computers. For example, if one of the labels is "Florida," there are millions of people that live in Florida and that have information about them stored in data repository 120. The list of candidate entities for Florida alone would be enormous. Accordingly, in one embodiment, server 110 may set a threshold. The threshold may be set automatically or manually for a particular query. For example, an administrator at one of terminals 130-140 may increase or decrease the number of candidate entities that search server 110 may return for the lists. Search server 110 may enforce a threshold specifying any labels having over a specified number of candidate entities (e.g., a million) should be discarded and should not continue in this process. Labels having a list of candidate entities below the threshold may continue to the next step of the process.

In step 240, search server 110 may examine the lists of candidate entities and search for candidate entities that appear in more than one list.

In step 250, search server 110 may assign each label a weight that is related to an inverse of the number of candidate entities in its list. That is, a unique label entity will produce one candidate and a rare label entity will produce a short candidate list (e.g., a rare name will not result in many matches). Conversely, a common label will produce a long candidate list (e.g., a common name will result in many matches). The weight that search server 110 assigns to each label is a measure of the rarity of the label (i.e., rare labels will have high weights and common labels will have low weights).

Next, in step 260, search server 110 may determine which of the candidate entities for each list are the most probable to be the target entity that corresponds to the label. In particular, search server 110 may use the weights to determine which of the candidate entities should be at the top of each list (i.e., which of the candidate entities are the best candidates). To do so, search server 110 may compare the lists and use the weights to order the candidate entities. When comparing the lists, search server 110 may determine which candidate entities appear on multiple lists and, for each list, may combine the weights assigned to the repeated candidate entities. Furthermore, in this step, search server 110 may eliminate the candidate entities from each list that have the lowest weight values. For example, search server 110 may establish a cutoff threshold. The threshold may be set automatically or manually. Accordingly, as a result of step 260, search server 110 may produce a plurality of short lists. Each short list may pertain to the set of candidate entities that are highest ranked for each label.

In step 270, search server 110 may examine each candidate entity remaining on each list in order to locate data that is related to each candidate entity. The data may be stored in data repository 120, for example. For candidate entities that are people, search server 110 may locate, for example, relatives, all companies the candidate entity has worked for, all homes lived in or owned, cars owned, telephone numbers, and/or email addresses of the candidate entity. For candidate entities that are businesses, search server 110 may locate, for example, employees, websites, emails, and/or related companies. For candidate entities that are websites, search server 110 may locate, for example, related companies and/or websites, related URLs, and/or people that work for the website's company. For candidate entities that are vehicles, search server 110 may locate, for example, for owners and/or registered addresses correspond to the vehicles.

In step 280, search server 110 may determine whether any of the entities that were located in step 270 are included on any other candidate entity lists. If the entities are on any other candidate entity lists, then search server 110 may modify the weight for that label to further refine the candidate list. That is, search server 110 may adjust the weight of a candidate entity when a leading candidate entity has a weight that is significantly greater than the next best candidate entity. Search server 110 may determine whether or not the leading candidate entity has a weight that is significantly greater by comparing the difference between the weights to a threshold.

In step 290, search server 110 may output the candidate entities for each label that have been determined to uniquely identify the target entity of the label. Furthermore, each candidate entity may be assigned an identifier that links the candidate entity to all of the information that is available for the candidate entity in the knowledge base. Accordingly, at the conclusion of step 290, when search server 110 determines that a candidate entity corresponds to the label, search server 110 may relate the candidate entity to information that is stored in the knowledge base for that candidate entity. Thus, in the example of a person, search server 110 may conclude that the candidate entity is in fact the person being referred to in the input data set (e.g., the "Bob Birdsal" in the data set is in fact Bob Birdsal that lives at 15 North Terrance Lane, Boca Raton, Fla.). Search server 110 may output the result to a file, store the result to a database, or generate a notification (e.g., a webpage, email, voicemail, etc.) including the results.

The above process sufficiently resolves most labels in order to determine the full entity reference that pertains to a label that was found in the input document. For example, the process may be performed to identify one or more target entities in a particular input document. However, search server 110 may iterate further to improve accuracy. For example, search server 110 may, for resolved candidates, bring in new data that is related to the resolved candidates. Search server 110 may compare the new data to the labels in the original input list. Accordingly, since an iterative approach allows search server 110 to examine data that is more than one degree of separation than the initial data.

The following provides an example of the above process. In the following example, an input document received by search server 110 includes the following text:

Early Tuesday Michael Peeps and his partner April Smith were murdered in their home in Jacksonville.

From the input document, search server 110 may identify the following candidate entities:

Early;
Tuesday;
Michael;
Peeps;
Early Tuesday;
Tuesday Michael;
Michael Peeps;
Early Tuesday Michael;
Tuesday Michael Peeps;
April Smith; and
Jacksonville.

Processing these candidate entities against data repository 120, for example, may produce the following candidate lists:

Person: Tuesday Michael (1 candidate);
Person: Michael Peeps (100 candidates);
Person: April Smith (10000 candidates);
Day: Tuesday;
Month: April; and
City: Jacksonville (25 candidate cities, each candidate city providing 1,000 to 150,000 candidate people).

Search server 110 may then compare the three person candidate lists to the 25 city candidate lists. In this example, "Tuesday Michael" does not appear in Jacksonville so that candidate entity scores 0. Furthermore, in this example, there are 3 Jacksonville cities containing at least one "April Smith" and 2 Jacksonville cities containing at least one "Michael Peeps." After scoring the above matches, search server 110 now applies a threshold. As a result of the application of the threshold, "Tuesday Michael" is dropped in favor of the "Michael" token being used in "Michael Peeps." Furthermore, 21 of the Jacksonville cities are dropped because they do not contain any of the people candidates. All of the "April Smiths" and "Michael Peeps" are dropped except those in a Jacksonville city. As a result, this leaves 2 persons with the name "Michael Peeps" and 200 persons with the name "April Smith."

Furthermore, one of the "Jacksonville" cities is scored higher than the others as it contains fifteen persons with the name "April Smith" and one "Michael Peeps." In the next stage, search server 110 may bring in all of the addresses that the 2 "Michael Peeps" have lived at and all of the addresses that the 200 "April Smiths" have lived at as lists. Accordingly, there are 202 address lists. Search server 110 may then compare these lists to each other. As a result of this comparison, search server 110 may determine that one of the persons with the name "Michael Peeps" lived in two buildings that were identical to two building lived in by one of the persons with the name "April Smith." Search server 110 may then score this "coincidence" and narrow down the person lists to the 1 "Michael Peeps" and "April Smith" that are referred to in the input document (i.e., the unique individuals have been identified). Having limited the person lists to unique individuals, it is now possible to see that only one of the Jacksonville cities has been lived in by these people.

The above is exemplary and should be understood to only provide an example of a possible process executed by search server 110.

The foregoing description has been presented for purposes of illustration. It is not exhaustive and does not limit the invention to the precise forms or embodiments disclosed. Modifications and adaptations of the embodiments will be apparent from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, embodiments may use different types of computer-readable media, such as secondary storage devices, for example, hard disks, floppy disks, or CD-ROM, the Internet or other propagation medium, or other forms of RAM or ROM.

Computer programs based on the written description and methods of this specification are within the skill of a software developer. The various programs or program modules can be created using a variety of programming techniques. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments have been described herein, the scope of the invention includes any and all embodiments having equivalent elements, modifications, omissions, combinations (e.g., of aspects across various embodiments), adaptations and/or alterations based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit of the invention being indicated by the following claims and their full scope of equivalents.

What is claimed is:

1. A computer-implemented method for identifying one or more target entities, the method comprising:
   receiving, by a computer, an input data set, wherein the input data set includes a plurality of tokens that reflect the one or more target entities;
   determining, by the computer, which of the tokens are labels;
   identifying, by the computer, one or more candidate entities that are related to each of the labels, wherein individual ones of the candidate entities are associated with a number of candidates;
   assigning, by the computer, a weight to each candidate entity of a label based on each candidate entity's associated number of candidates, wherein the weight that is assigned to a particular one of the candidate entities is related to an inverse of the number of candidates associated with the particular candidate entity;
   ranking, by the computer the candidate entities of the label according to the assigned weights; and
   outputting, by the computer, one of the plurality of candidate entities for the label that has been assigned a highest weight value.

2. The method of claim 1, wherein the tokens that reflect the one or more target entities form partial entity references of the one or more target entities.

3. The method of claim 1, wherein determining which of the tokens are labels includes searching a database storing known labels for one or more of the tokens.

4. The method of claim 1, further comprising:
storing a threshold value;
determining whether a quantity of the candidate entities for a particular label exceeds the threshold value; and
if the quantity of candidate entities for the particular label exceeds the threshold value, discarding the particular label.

5. The method of claim 1, wherein if a candidate entity of a first label is associated with a second label, the method further comprises:
modifying the weight of the candidate entity of the first label.

6. The method of claim 1, further comprising:
storing a threshold value; and
eliminating individual ones of the candidate entities that have a weight value lower than the threshold value.

7. The method of claim 1, further comprising:
determining one or more related candidate entities that are related to each of the candidate entities.

8. The method of claim 7, wherein for ones of the candidate entities that are persons, the method further comprising:
searching for relatives, companies the candidate entity has worked for, homes lived in or owned, cars owned, telephone numbers, or email addresses of the candidate entity.

9. The method of claim 7, wherein for ones of the candidate entities that are businesses, the method further comprising:
searching for employees, websites, emails, or related companies.

10. The method of claim 7, wherein for ones of the candidate entities that are websites, the method further comprising:
searching for related companies or websites, related URLs, or people that work for the website's company.

11. The method of claim 7, wherein for ones of the candidate entities that are vehicles, the method further comprises:
searching for owners or registered addresses correspond to the vehicles.

12. The method of claim 1, wherein for each label, the one of the candidate entities for that label that has been assigned a highest weight value is related to an identifier that links the one of the candidate entity to information in a database.

13. A computer-readable storage medium storing program instructions for implementing a method executable by a processor for identifying one or more target entities, the method comprising:
receiving an input data set, wherein the input data set includes a plurality of tokens that reflect the one or more target entities;
determining which of the tokens are labels;
identifying one or more candidate entities that are related to each of the labels, wherein individual ones of the candidate entities are associated with a number of candidates;
assigning a weight to each candidate entity of a label based on each candidate entity's associated number of candidates, wherein the weight that is assigned to a particular one of the candidate entities is related to an inverse of the number of candidates associated with the particular candidate entity;
ranking the candidate entities of the label according to the assigned weights; and
outputting one of the plurality of candidate entities for the label that has been assigned a highest weight value.

14. The computer-readable storage medium of claim 13, wherein the tokens that reflect the one or more target entities form partial entity references of the one or more target entities.

15. The computer-readable storage medium of claim 13, wherein determining which of the tokens are labels includes searching a database storing known labels for one or more of the tokens.

16. The computer-readable storage medium of claim 13, further comprising:
storing a threshold value;
determining whether a quantity of candidate entities for a particular label exceeds the threshold value; and
if the quantity of the candidate entities for the particular label exceeds the threshold value, discarding the particular label.

17. The computer-readable storage medium of claim 13, wherein if a candidate entity of a first label is associated with a second label, the method further comprises:
modifying the weight of the candidate entity of the first label.

18. The computer-readable storage medium of claim 13, further comprising: storing a threshold value; and
eliminating individual ones of the candidate entities that have a weight value lower than the threshold value.

19. The computer-readable storage medium of claim 13, further comprising:
determining one or more related candidate entities that are related to each of the candidate entities.

20. The computer-readable storage medium of claim 19, wherein for ones of the candidate entities that are persons, the method further comprising:
searching for relatives, companies the candidate entity has worked for, homes lived in or owned, cars owned, telephone numbers, or email addresses of the candidate entity.

21. The computer-readable storage medium of claim 19, wherein for ones of the candidate entities that are businesses, the method further comprising:
searching for employees, websites, emails, or related companies.

22. The computer-readable storage medium of claim 19, wherein for ones of the candidate entities that are websites, the method further comprising:
searching for related companies or websites, related URLs, or people that work for the website's company.

23. The computer-readable storage medium of claim 19, wherein for ones of the candidate entities that are vehicles, the method further comprising:
searching for owners or registered addresses correspond to the vehicles.

24. The computer-readable storage medium of claim 13, wherein for each label, the one of the candidate entities for that label that has been assigned a highest weight value is related to an identifier that links the one of the plurality of candidate entity to information in a database.

25. A system for identifying one or more target entities, the system comprising:
a data repository; and
a server in communication the data repository, the server:
receiving an input data set, wherein the input data set includes a plurality of tokens that reflect the one or more target entities;
determining which of the tokens are labels;

identifying one or more candidate entities that are related to each of the labels, wherein individual ones of the candidate entities are associated with a number of candidates;

assigning a weight to each candidate entity of a label based on each candidate entity's associated number of candidates, wherein the weight that is assigned to a particular one of the candidate entities is related to an inverse of the number of candidates associated with the particular candidate entity;

ranking the candidate entities of the label according to the assigned weights; and outputting one of the plurality of candidate entities for the label that has been assigned a highest weight value.

26. The system of claim 25, wherein the tokens that reflect the one or more target entities form partial entity references of the one or more target entities.

27. The system of claim 25, wherein the server determines which of the tokens are labels by searching a database storing known labels for one or more of the tokens.

28. The system of claim 25, the server further:
storing a threshold value;
determining whether a quantity of candidate entities for a particular label exceeds the threshold value; and
if the quantity of the candidate entities for the particular label exceeds the threshold, discarding the particular label.

29. The system of claim 25, wherein if a candidate entity of a first label is associated with a second label, the server modifies the weight of the candidate entity of the first label.

30. The system of claim 25, the server further:
storing a threshold value; and
eliminating individual ones of the candidate entities that have a weight value lower than the threshold value.

31. The system of claim 25, the server further:
determining one or more related candidate entities that are related to each of the candidate entities.

32. The system of claim 31, wherein for ones of the candidate entities that are persons, the server further:
searching for relatives, companies the candidate entity has worked for, homes lived in or owned, cars owned, telephone numbers, or email addresses of the candidate entity.

33. The system of claim 31, wherein for ones of the candidate entities that are businesses, the server further:
searching for employees, websites, emails, or related companies.

34. The system of claim 31, wherein for ones of the candidate entities that are websites, the server further:
searching for related companies or websites, related URLs, or people that work for the website's company.

35. The system of claim 31, wherein for ones of the candidate entities that are vehicles, the server further:
searching for owners or registered addresses correspond to the vehicles.

36. The system of claim 25, wherein for each label, the one of the candidate entities for that label that has been assigned a highest weight value is related to an identifier that links the one of the candidate entity to information in a database.

* * * * *